Figure 1:
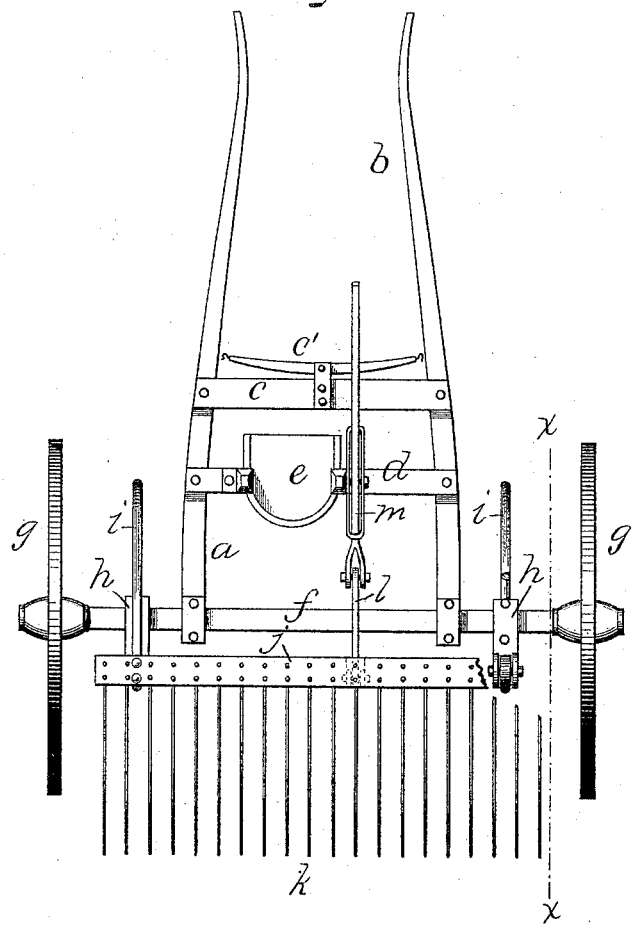

(No Model.) 2 Sheets—Sheet 1.

E. RISLEY.
HORSE HAY RAKE.

No. 341,947. Patented May 18, 1886.

Witnesses:
H. P. Williams
A. C. Tanner

Inventor:
Edwin Risley
By Simonds & Burdett,
Attys.

(No Model.) 2 Sheets—Sheet 2.
E. RISLEY.
HORSE HAY RAKE.
No. 341,947. Patented May 18, 1886.
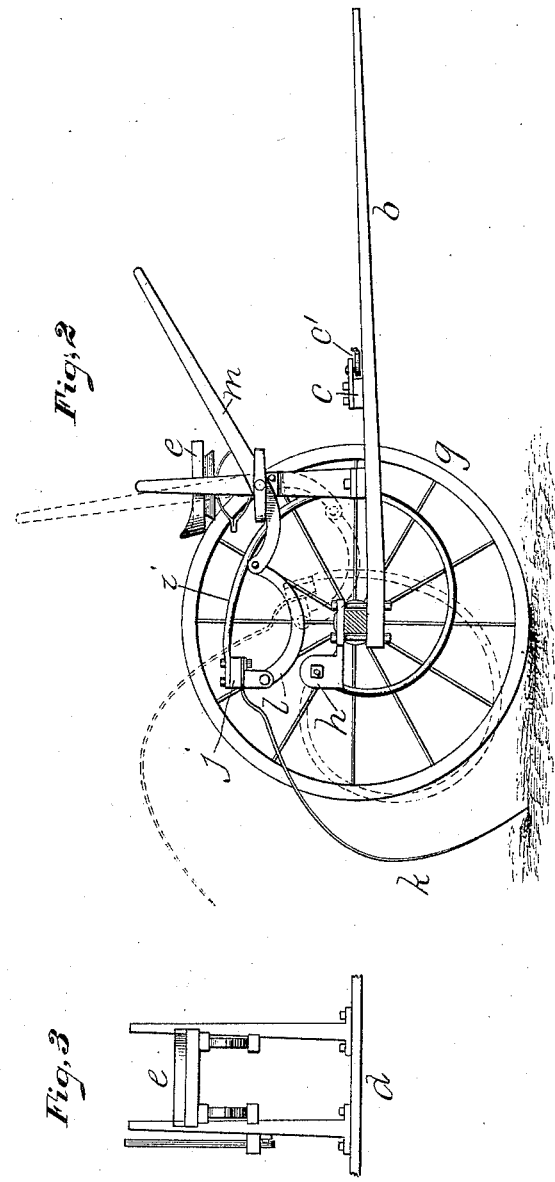
Witnesses:
H. P. Williams
A. C. Tanner
Inventor:
Edwin Risley
By Simonds & Burdett,
attys.

UNITED STATES PATENT OFFICE.

EDWIN RISLEY, OF ROCKY HILL, CONNECTICUT.

HORSE HAY-RAKE.

SPECIFICATION forming part of Letters Patent No. 341,947, dated May 18, 1886.

Application filed May 28, 1885. Serial No. 166,899. (No model.)

*To all whom it may concern:*

Be it known that I, EDWIN RISLEY, of Rocky Hill, in the county of Hartford and State of Connecticut, have invented certain new and useful Improvements in Horse Hay-Rakes, of which the following is a description, reference being had to the accompanying drawings, where—

Figure 1 is a top view of a hay-rake embodying my improvements. Fig. 2 is a view of the rake in vertical section on the plane denoted by line $x\ x$ of Fig. 1, the solid lines denoting the teeth in position for raking and the dotted lines the position of the teeth when raised. Fig. 3 is a detail front view of the seat.

The object of my invention is to simplify and cheapen the construction of horse hay-rakes, and at the same time produce one that shall be effective and easy of operation; and it consists in the combination of a wheeled frame with a hay-rake pivotally connected to the frame so that it is in unstable equilibrium and is counterpoised to a certain degree, the connection being preferably by means of curved arms in the connected mechanism for operating the rake, and in other details of construction, as more particularly hereinafter described.

In the accompanying drawings, the letter $a$ denotes the frame of the rake, made up in the usual manner of the shafts $b$, the cross bar $c$, supporting the whiffletree $c'$, and the cross-bar $d$, supporting the seat $e$, and fast to the axle $f$, bearing the wheels $g$ of ordinary construction. The stands $h$ are secured to the axle at suitable points, preferably near opposite ends of the same, and to each of these stands is pivotally connected a curved arm, $i$, which is preferably made of spring-steel. Each of these arms extends from its point of connection with the axle downward, thence up in front of the axle, and turns backward for a certain distance, so that its upper end substantially overhangs the axle, and each arm is firmly connected to the tooth-bar $j$ of the rake.

The particular form and arrangement of the rake-supporting arms is not material to my invention so long as the opposite ends of such curved or bent arms are respectively connected to the axle and the tooth-bar of the rake in such manner that the rake is supported in unstable equilibrium. This tooth-bar bears a suitable number of curved teeth, $k$, which are of ordinary material, and form, and which extend backward and downward from the bar so that they may be placed in position to be dragged along the ground, as in the act of raking; and to this tooth-bar is pivoted an arm, $l$, whose other end is pivoted to the short arm of a lever, $m$, which is pivotally connected to the standard which supports the seat, or to any other suitable part of the frame, so that the upper end of the lever may be in convenient position to be grasped by a person when in the seat. The lever and connected arm are so combined and arranged that the center pivot may be raised above the line of the other two, as shown in Fig. 2, when the teeth are thrown down in position for raking, as this locks the device and in a measure prevents the accidental lifting of the tooth-bar.

The particular advantage of my improvement in thus suspending the tooth-bar to the axle by means of the curved arms lies in the fact that the bar is thus placed in unstable equilibrium, and it takes but little force to turn the parts upon their pivotal connections at the lower end of the arm either to raise the teeth or lower them. These spring-arms also afford an elastic support for the tooth-bar and connected teeth that aids the operation of the latter and relieves the frame of jars and shaking motion common to old forms of rakes of the like class. The pivotal connection of the tooth-head, the arm $l$, and the lever $m$ to each other enables me to utilize this elastic function of the rake-supporting arms in the device, as it offers but slight resistance to the rising and falling motion of the head. The seat $e$ is preferably supported so as to be vertically movable between the upright standards, which are fast to the cross-bar of the frame, and is borne on the elliptic springs placed between the seat and brackets fast to the inner sides of the supporting-standards. Any other desirable form of seat may of course be used in place of this particular form.

The method of operating my device is as follows: The teeth being raised in position (shown in dotted outline in Fig. 2) they are dropped in position for raking by throwing the lever-handle forward, and after a sufficient quantity of hay has been raked up the teeth are again raised by a backward pull upon the handle of the lever, the force required to do that being, as already stated, but very slight. A toothed rack or like device may be fastened to the standard supporting this lever, so that the teeth may be held at any desired height, by engaging the lever with the rack.

I claim as my invention—

1. In a rake of the within-described class, a wheeled frame, a, a rake attached to the frame, elastic rake-supporting arms that suspend in unstable equilibrium the tooth-head above the pivotal connection of the arms to the frame or part fast thereto, and a rake-lifting lever pivotally connected to the frame and the tooth-head, all substantially as described.

2. In combination with a wheeled frame, a swinging rake, with downturned curved arms of spring-metal attached to the tooth-bar and pivotally connected to the frame or an axle fast thereto, all substantially as described.

3. In combination with a wheeled frame, a swinging rake, the curved arms of spring metal attached to the tooth-bar of the rake and pivotally connected to the axle or like part fast to the frame, and a lever pivoted to a standard fast to the frame and pivotally connected to the tooth-bar, whereby the rake may be raised or lowered, all substantially as described.

4. In a rake of the within-described class, a frame, a, a swinging rake with a tooth-bar, j, suspended above the axle f, spring-arms i, supporting the rake in unstable equilibrium, lever m, and the arm l, pivotally connecting the lever to the tooth-head, all substantially as described.

EDWIN RISLEY.

Witnesses:

CHAS. L. BURDETT,
H. R. WILLIAMS.